United States Patent [19]

Stuart, Jr.

[11] 4,411,465

[45] Oct. 25, 1983

[54] DOOR ACTUATING MECHANISM

[76] Inventor: Guy E. Stuart, Jr., 518 Adams St., Owosso, Mich. 48867

[21] Appl. No.: 313,336

[22] Filed: Oct. 19, 1981

[51] Int. Cl.³ .............................................. B60J 5/04
[52] U.S. Cl. ................................ 296/146; 296/24 R; 49/357
[58] Field of Search .............. 296/146, 24 R; 49/357, 49/339

[56] References Cited

U.S. PATENT DOCUMENTS

| | | | |
|---|---|---|---|
| 1,111,801 | 9/1914 | MacKearnin | 49/357 |
| 1,589,410 | 6/1926 | Milner | 296/146 |
| 1,969,767 | 8/1934 | Steele | 296/146 |
| 2,140,053 | 12/1938 | Joslin | 296/146 |

Primary Examiner—Robert R. Song
Attorney, Agent, or Firm—Dale A. Winnie

[57] ABSTRACT

An operating mechanism for opening and closing rear seat doors in taxi cabs and other passenger car vehicles and comprising; an operative link that can be connected to the forwardly disposed edge of a back seat door in front of its hinge axis, an opening that is provided through the vehicle pillar post on which the back seat door is hung for receiving said link therethrough, and with a lever or some other operating means to push and pull the operating link so that it will respectively open and close the vehicle door that it is connected to.

5 Claims, 3 Drawing Figures

DOOR ACTUATING MECHANISM

BACKGROUND OF THE INVENTION

At one time or another everyone who drives a car has wanted to be able to open the back seat door, on the curb side, without getting out of the car.

Usually this happens when in heavy traffic or at a congested location and you want to stop the car and let an elderly person, a small child, or a handicapped person get out of the car a little closer to their ultimate destination. For example, at hotel or hospital entrances, in front of a store or theater, taking someone to the airport, or a train station, at a school, or doctor's office, etc.

Taxi cab drivers are particularly perplexed with this problem.

Another problem, for taxi drivers, is when someone leaves the back door open, after getting out of the car, and they have to get out and go around the car to close the door themselves. This is one of many ploys used by hold-up men or women to get the cab driver out from behind the protective shield in the cab so that they can rob them of their money.

For these and other reasons, there is need for some means of both opening and closing the curb side back seat door of a passenger car vehicle from the driver's seat in the vehicle and without getting out of the car.

Further, although door openers in buses and other common carrier vehicles are generally known, which use a reach rod or bar that extends across the inside corner of the door when it is closed, the means used should be as inconspicuous and take up as little room as possible if it is to be practical for small vehicle and general passenger car use.

It also follows that the means used should be reasonably simple in construction and assembly, and be inexpensive to manufacture and install, so that the cost will be low enough to make it practical for general use.

SUMMARY OF THE INVENTION

This invention relates to a means and method for both closing and opening the curb side back seat door in a passenger car vehicle from the driver's seat and without getting out of the vehicle.

It includes an operating mechanism that can be mounted just behind the driver's seat; as, in a taxi cab, on the protective wall that extends across the vehicle between the pillar post supports on each side of the vehicle.

The operating mechanism itself includes a lever, preferably of a bell crank shape, which is disposed vertically and has a handle at its upper end to enable it to be pushed and pulled, in relatively opposite directions, to open and close the rear seat door. An operating link is connected to the lower disposed end of the lever and it extends through an opening that is provided in the pillar post that supports the rear seat door to be opened and closed. And the other end of the operating link is connected to the forwardly disposed edge of the rear seat door, in front of its hinge axis, by means of a bracket hidden by the door edge flange that overlies and covers the vehicle pillar post on the vehicle.

Other operating means may be used, besides the lever, such as a solenoid operator, rack and pinion or other gear motor, and the like. The lever operator is shown for simplicity, mostly, and as one of the least expensive operating means that is practical to use.

It also follows that the mechanism disclosed might also be adapted to latch or unlatch, lock or unlock, a vehicle door as well as to open and close it.

These and other objects and advantages to be gained in the practice of the present invention will best be known and understood upon a reading of the following specification which refers to the accompanying drawing and describes in detail a working embodiment of the invention.

IN THE ACCOMPANYING DRAWING

DETAILED DESCRIPTION OF THE ILLUSTRATED EMBODIMENT

Figure 1:
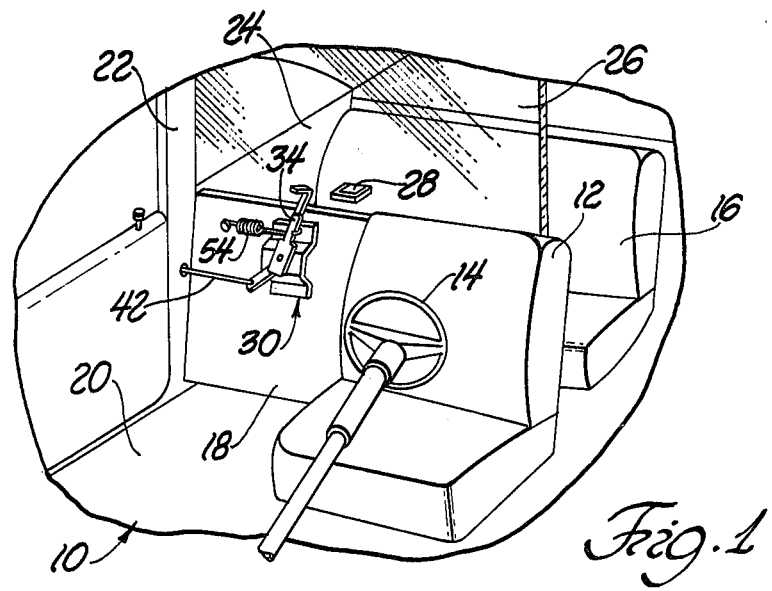
FIG. 1 is a cut-away perspective view of the inside of a taxi cab showing the protective shield between the seats and with the operative mechanism of the present invention mounted thereon.

Referring to the drawing figures, a taxi cab vehicle 10 is shown with the driver's seat 12 in front, just behind the steering wheel 14, and with the passenger seat 16 across the back of the vehicle.

A protective shield 18 is mounted on the vehicle floor 20 and extends transversely across the vehicle between the pillar posts 22 on each side of the car and on which the rear seat doors 24 are hung. Usually, in taxi cabs, a thick protective see-through plexiglass, or bullet proof glass shield 26 is mounted on top of the lower heavy gauge metal shield 18 behind the driver's seat.

Also shown is the money slot and tray 28, in the see-through shield 26, through which passengers may pay their cab fare.

The operating mechanism of the present invention is shown as mounted on the lower metal wall shield 18, to one side of the driver's seat 12, and is identified by the numeral 30.

Figure 3:
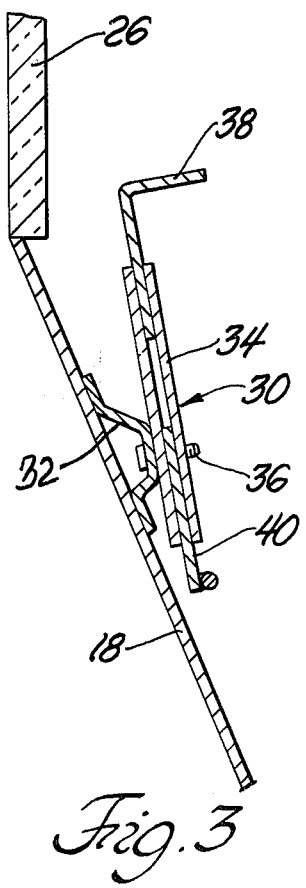
FIG. 3 is a cross-sectional view and still further enlargement of the operative mechanism of the present invention as seen in the plane of line 3—3 of the previous drawing figure and looking in the direction of the arrows.

Basically, it includes a mounting bracket 32 that has a couple of flanges which can be spot welded or otherwise fastened to the lower supporting wall or shield member 18. And it includes a lever arm part 34 that is mounted on the bracket and is pivotal about a connection 36 to the offset part of the mounting bracket, as best seen in FIG. 3.

The lever arm part 34 includes a handle part 38 at its upper end and a lower end lever part 40 at its other end. Both the handle part and the lower end lever part may be made longer or shorter than shown and/or with offset angles for variations in production and manufacture to enable use on different vehicles. In this way the same basic parts may be used to provide an operating mechanism for several like but different taxi cab vehicles, for example, with the crank angle and stroke being variable or changeable.

An operating link 42, which in the present instance is of rod or bar stock, is connected by a ball or swival joint connection, to facilitate alignment and articulation, to the bell crank end of lever 34 and has its other end extended through a hole 44, in the pillar post 22, and similarly connected to a Bracket 50 attached to the forwardly disposed edge of the back door 24 and extending further beyond its hinge axis. As will be generally appreciated, the pillar post 22 is of sheet metal and box construction so that the hole or opening 44 is actually two holes through opposite walls and relatively aligned. The back door 24, in turn, will be appreciated as having spaced inner and outer walls with an end wall 46, which is usually used to hinge and hang the door on the pillar post, and with a flange 48 that is part of the outer door wall and extends over and covers the pillar post. The bracket 50 serves as a stronger load transmitting member than the sheet metal flange 48 and as a structural extension of the door past its hinge axis for the door closing and opening purposes proposed.

When the lever arm 34 is moved outwardly towards the door it is connected to, the operating link 42 is drawn inwardly and retracted into the vehicle. And when the lever arm 34 is pulled inwardly, towards the driver's seat, the operating link 42 is pushed outwardly through the pillar post hole 44 and acts on the bracket extension 50 behind the door flange 48.

Figure 2:
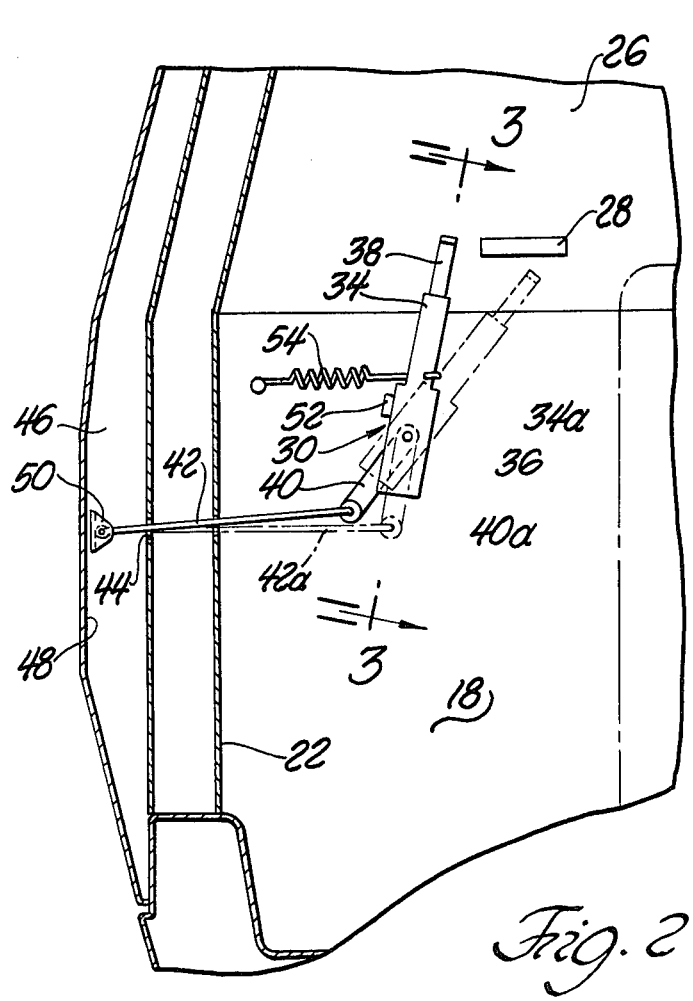
FIG. 2 is an enlarged front elevational and partially cross-sectioned view of the curb side of the taxi cab as seen inside the cab and looking at the protective shield with the operative mechanism mounted thereon and with the mounting bracket not shown, for greater clarity in describing the structure, operation and function of the operating mechanism itself.

The lever arm 34 is made of sheet metal folded over on itself and with one edge, the door facing side, left open. And, the lower end lever part 40 is provided therewithin and pinned with the lever arm at connection 36. Consequently, when the lever arm 34 is at rest against its stop 52, as shown in the full line view in FIG. 2, the lever part 40 is free to move between positions 40 and 40a.

When someone opens the rear door 24, the operating link 42, connected to the door by bracket 50, will be moved inwardly and the lower lever part will assume the position 40a. Then, when the rear door is closed, the operating link will be pulled outwardly and the lower lever part will assume the position 40.

Should someone leave the door 24 open, the cab driver can pull lever 34 down towards him, and cause it to push the lower lever part forwardly from position 40a to 40. This acts on the rod 42, causing it to exert an axial force outwardly, against bracket 50, and to close the door.

In those instances where opening and closing assistance for the back door is desirable, it will be appreciated that the lower end lever part 40 can be fixed or fastened to the lever arm 34 to be pulled outwardly as well as for being pushed inwardly.

The tension spring 54 is used to hold lever arm 34 in an at rest rattle-free position against the stop 52. If the mechanism is of the type that is used only to close the rear door, the lever is held against the stop and doesn't move when the door is opened and closed by anyone getting in or out of the cab; the lever part 40 being free to travel in and out of the open side of the lever arm.

While the back door 24 has to swing through a wide arc to allow reasonable access to and from the back seat, the connection point on Bracket 50 on the other side of the hinge axis travels through a much smaller arc. And, accordingly, the stroke or distance that the operating link and lever arm travel in the course of opening or closing the door 24 will be relatively small.

Further, it will be appreciated that all car doors are counter balanced to swing relatively free, with minimal effort, so that young children, women and older people can open and close the doors with reasonable ease. Consequently, the car door that the operating link is connected to is capable of being opened and closed with relative ease, after some starting assistance, from the flange side as well as the outer door handle side of the hinge axis.

In practice, when the installation is one for simply closing a back door that is left open, the lower lever part 40 is movable relative to the lever part 34, in and out of its open side. When the back door is left open, and the driver wants to close it, the handle 38 is pulled inwardly and down, pivoting lever arm 34 on the pivot connection 36 and pushing the lower lever part of rod 42 which in turn acts on bracket 50 and, being on the forward side of the door's hinge axis, causes the door to swing closed.

If the lever arm 34 and part 40 are fastened or fixed together, then the handle part 38 can be pulled down to assist in closing the door, as described, and also pushed outwardly to cause the rod 42 to act on the bracket 50 and exert a force that will swing the rear door 24 into an open position.

From the foregoing it will be appreciated that the proposed mechanism is relatively simple in principal and therefore relatively inexpensive to manufacture and assemble. Further, although a basic and simple arrangement has been shown for purposes of illustration, other refinements and benefits may be incorporated and used in conjunction with the present invention; as for example, power operators, automatic door locking and unlocking or latching and unlatching mechanism and the like.

Such other objects and advantages as are within the spirit of the hereinafter claims, and are not specifically excluded by the language thereof, are also to be considered as inclusive thereunder and to be within the protection afforded thereby.

I claim:

1. An operating mechanism for selectively closing and opening a vehicle door, and comprising;
    a support structure and means for mounting said support structure in a fixed location within a vehicle,
    an operative link and means for connecting one end of said link to a rearwardly opening vehicle door forwardly of the door's hinge axis,
    and operative means provided on said support structure, readily accessible from the driver's seat in said vehicle, and operatively connected to said operating link for allowing the driver of the vehicle to selectively pull-closed and push-open said vehicle door,
    said support structure being provided between the front and back seats of a passenger car vehicle,
    a bracket provided on said door and formed to provide a structural extension forwardly of its hinge axis,
    and means connecting said operative link to said bracket for transmitting a door actuating force therethrough.

2. The operating mechanism of claim 1, wherein;
    said operative means includes a lever mounted to obtain a mechanical advantage in the opening and closing of a door connected thereto.

3. The operating mechanism of claim 2, wherein;
    said operative link is adapted to move freely in an articulated motion and be guided through a pillar post of said vehicle.

4. The operating mechanism of claim 1,
said support structure including a protective wall located immediately behind the driver's seat and provided transversely across said vehicle and between the rear door supporting pillar posts thereof,
a mounting bracket provided on the forwardly disposed side of said wall and relatively next adjacent to the driver's seat in said vehicle,
said operative means including a lever arm member pivotally mounted on said bracket and having a handle provided on the upper disposed end thereof,
a lower lever member part pivotal with said lever arm member and independently thereof,
said lever member part being connected to said operating link and said operating link having sufficient stiffness for transmitting an axial push-pull force therethrough without bending,
a pillar post opening for receiving and guiding said operating link therethrough and for engagement with the forwardly disposed edge of a rearwardly opening door mounted on the pillar post,
and a bracket on said door providing a forwardly disposed structural extension thereof for transmitting a door actuating force thereto and having said operating link connected thereto forwardly of the hinge axis for said door.

5. An operating mechanism for selectively closing and opening a vehicle door, and comprising;
a support structure and means for mounting said support structure in a fixed location within a vehicle and relatively behind the driver's seat in said vehicle,
an operative link and means for connecting one end of said link to a rearwardly disposed and outwardly and rearwardly opening vehicle door forwardly of the door's hinge axis,
and operative means provided on said support structure, readily accessible from the driver's seat in said vehicle, and operatively connected to said operating link for allowing the driver of the vehicle to selectively pull-closed and push-open said vehicle door.

* * * * *